United States Patent
Takano et al.

(10) Patent No.: US 11,011,778 B2
(45) Date of Patent: May 18, 2021

(54) SOLID-STATE ELECTROLYTE AND ALL-SOLID-STATE BATTERY

(71) Applicant: Murata Manufacturing Co., Ltd., Nagaokakyo (JP)

(72) Inventors: Ryohei Takano, Nagaokakyo (JP); Makoto Yoshioka, Nagaokakyo (JP); Akisuke Ito, Nagaokakyo (JP); Takeo Ishikura, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 123 days.

(21) Appl. No.: 16/289,905

(22) Filed: Mar. 1, 2019

(65) Prior Publication Data
US 2019/0198921 A1  Jun. 27, 2019

Related U.S. Application Data

(63) Continuation of application No. PCT/JP2017/032529, filed on Sep. 8, 2017.

(30) Foreign Application Priority Data

Sep. 21, 2016 (JP) ............................ JP2016-184775

(51) Int. Cl.
*H01M 10/0562* (2010.01)
*H01M 10/0585* (2010.01)
(Continued)

(52) U.S. Cl.
CPC ......... *H01M 10/0562* (2013.01); *C01F 17/00* (2013.01); *C01G 25/006* (2013.01);
(Continued)

(58) Field of Classification Search
CPC .. H01M 10/0562; H01M 4/62; C01G 25/006; C01G 33/006; C04B 35/485; C04B 35/50; C04B 35/6862
See application file for complete search history.

(56) References Cited

U.S. PATENT DOCUMENTS 8,883,357 B2   11/2014  Yoshida et al.
8,986,895 B2*  3/2015   Ohta ................. C04B 35/495
                                                429/322
(Continued)

FOREIGN PATENT DOCUMENTS

CN   102867985 A   1/2013
JP   2011051800 A  3/2011
(Continued)

OTHER PUBLICATIONS

Machine translation of JP 2016-160160 (no date).*
(Continued)

*Primary Examiner* — Amanda C. Walke
(74) *Attorney, Agent, or Firm* — Arent Fox LLP

(57) ABSTRACT

A solid-state electrolyte having a garnet-type crystal structure represented by the formula $(Li_{7-ax+y}A_x)La_3(Zr_{2-y}B_y)O_{12}$, where A is at least one element selected from Mg, Zn, Al, Ga, and Sc, a is a valence of A, B is at least one element selected from Al, Ga, Sc, Yb, Dy, and Y, x is more than 0 and less than 1.0, y is more than 0 and less than 1.0, and $7-ax+y$ is more than 5.5 and less than 7.0.

16 Claims, 3 Drawing Sheets

(51) Int. Cl.

| | |
|---|---|
| *C01G 25/00* | (2006.01) |
| *H01M 4/62* | (2006.01) |
| *C04B 35/626* | (2006.01) |
| *C04B 35/50* | (2006.01) |
| *C01F 17/00* | (2020.01) |
| *H01B 1/08* | (2006.01) |
| *H01M 10/052* | (2010.01) |
| *C04B 35/486* | (2006.01) |
| *C01G 33/00* | (2006.01) |

(52) U.S. Cl.
CPC .......... *C01G 33/006* (2013.01); *C04B 35/486* (2013.01); *C04B 35/50* (2013.01); *C04B 35/6268* (2013.01); *H01B 1/08* (2013.01); *H01M 4/62* (2013.01); *H01M 10/052* (2013.01); *H01M 10/0585* (2013.01); *C01P 2002/30* (2013.01); *C01P 2002/50* (2013.01); *C01P 2006/40* (2013.01); *C04B 2235/3203* (2013.01); *C04B 2235/3206* (2013.01); *C04B 2235/3217* (2013.01); *C04B 2235/3224* (2013.01); *C04B 2235/3225* (2013.01); *C04B 2235/3227* (2013.01); *C04B 2235/3284* (2013.01); *C04B 2235/3286* (2013.01); *C04B 2235/764* (2013.01); *C04B 2235/77* (2013.01); *H01M 2300/0077* (2013.01)

(56) References Cited

U.S. PATENT DOCUMENTS

| | | |
|---|---|---|
| 9,350,047 B2 | 5/2016 | Yoshida et al. |
| 9,531,036 B2* | 12/2016 | Ohta .................. H01M 10/0562 |
| 9,537,175 B2 | 1/2017 | Kintaka |
| 9,761,905 B2* | 9/2017 | Eisele .................... C04B 35/495 |
| 9,806,372 B2* | 10/2017 | Holme ................... C04B 35/495 |
| 9,853,322 B2 | 12/2017 | Kawaji et al. |
| 10,026,990 B2* | 7/2018 | Badding ........... H01M 10/0562 |
| 10,431,806 B2* | 10/2019 | Donnelly .......... C04B 35/62645 |
| 2010/0047696 A1 | 2/2010 | Yoshida et al. |
| 2014/0186720 A1 | 7/2014 | Kintaka |
| 2014/0377665 A1 | 12/2014 | Yoshida et al. |
| 2015/0044575 A1 | 2/2015 | Kawaji et al. |
| 2016/0268629 A1 | 9/2016 | Tsukada et al. |
| 2016/0268630 A1 | 9/2016 | Tsukada et al. |
| 2017/0133711 A1* | 5/2017 | Gaben ................. H01M 4/0471 |
| 2017/0309955 A1 | 10/2017 | Kataoka et al. |
| 2018/0219253 A1* | 8/2018 | Ohta .................... C01G 33/006 |
| 2018/0294520 A1 | 10/2018 | Takano et al. |
| 2019/0088993 A1* | 3/2019 | Ohta ..................... C04B 35/645 |
| 2020/0052326 A1* | 2/2020 | Hu ..................... H01M 10/0525 |
| 2020/0168947 A1* | 5/2020 | Yamamoto .............. H01M 4/62 |

FOREIGN PATENT DOCUMENTS

| | | |
|---|---|---|
| JP | 2012238545 A | 12/2012 |
| JP | 2013037992 A | 2/2013 |
| JP | 2014170734 A | 9/2014 |
| JP | 2015035334 A | 2/2015 |
| JP | 2016160160 A | 9/2016 |
| WO | 2016068329 A1 | 5/2016 |
| WO | 2017135461 A1 | 8/2017 |

OTHER PUBLICATIONS

International Search Report issued in PCT/JP2017/032529, dated Nov. 7, 2017.

Written Opinion of the International Searching Authority issued in PCT/JP2017/032529, dated Nov. 7, 2017.

Rosenkiewitz et al., "Nitrogen-free sol-gel synthesis of Al-substituted cubic garnet $Li_7La_3Zr_2O_{12}$ (LLZO)," Journal of Power Sources, vol. 278, 2015, pp. 104-108.

Raskalov et al., "Structure and transport properties of $Li_7La_3Zr_{2-0.75x}AL_xO_{12}$ superionic solid electrolytes," Journal of Power Sources, vol. 238, 2013, pp. 48-52.

Rettenwander et al., "Site Occupation of Ga and Al in Stabilized Cubic $Li_{7-3(x+y)}Ga_xAl_yLa_3Zr_2O_{12}$ Garnets as Deduced from $^{27}Al$ and $^{71}Ga$ MAS NMR at Ultrahigh Magnetic Fields," Chemistry of Materials, vol. 27, 2015, pp. 3135-3142.

Düvel et al., "Mechanosynthesis of Solid Electrolytes: Preparation, Characterization, and Li Ion Transport Properties of Garnet-Type Al-Doped $Li_7La_3Zr_2O_{12}$ Crystallizing with Cubic Symmetry," The Journal of Physical Chemistry C, vol. 116, 2012, pp. 15192-15202.

Rettenwander, Daniel et al.; "Structural and Electrochemical Consequences of Al and Ga Cosubstitution in $Li_7La_3Zr_2O_{12}$ Solid Electrolytes"; Chemistry of Materials, vol. 28, No. 7, Apr. 12, 2016, pp. 2384-2392.

Buannic, Lucienne et al.; "Dual Substitution Strategy to Enhance $Li^+$ Ionic Conductivity in $Li_7La_3Zr_2O_{12}$ Solid Electrolyte"; Chemistry of Materials, vol. 29, No. 4, Jan. 20, 2017, pp. 1769-1778.

Chinese Office Action dated Dec. 4, 2019 and issued for Chinese Patent Application No. 201780057925.1 (English translation attached—14 pages).

Wang et al.; "The synergistic effects of Al and Te on the structure and Li+-mobility of garnet-type solid electrolytes"; Journal of Materials Chemistry A, 2014, 2, pp. 20271-20279.

Liu, et al.; "Technological Advances in Preparation and Doping Modification of $Li_7La_3Zr_2O_{12}$ as Inorganic Solid Electrolyte"; Materials Review A, Overview, Jul. 2016 (A), vol. 30, Issue 7, pp. 71-75. (English translation of abstract and described in English translation of Chinese Office Action).

\* cited by examiner

SOLID-STATE ELECTROLYTE AND ALL-SOLID-STATE BATTERY

CROSS REFERENCE TO RELATED APPLICATIONS

The present application is a continuation of International application No. PCT/JP2017/032529, filed Sep. 8, 2017, which claims priority to Japanese Patent Application No. 2016-184775, filed Sep. 21, 2016, the entire contents of each of which are incorporated herein by reference.

FIELD OF THE INVENTION

The present invention relates to a solid-state electrolyte and an all-solid-state battery.

BACKGROUND OF THE INVENTION

Conventionally, all-solid-state batteries have been known as secondary batteries having excellent reliability and safety. For example, Patent Document 1 discloses a ceramic material containing lithium (Li), lanthanum (La), zirconium (Zr), oxygen (O), and aluminum (Al), and having a garnet-type crystal structure, as a ceramic material exhibiting denseness and Li conductivity with a level of being usable as a solid-state electrolyte material or the like.

Patent Document 1: Japanese Patent Application Laid-Open No. 2011-051800

SUMMARY OF THE INVENTION

There is a demand to improve the ionic conductivity of solid-state electrolytes and to improve the battery characteristics of all-solid-state batteries.

A main object of the present invention is to improve the ionic conductivity of the solid-state electrolyte and to improve the battery characteristics of the all-solid-state battery.

The solid-state electrolyte according to the present invention is a solid-state electrolyte having a garnet-type crystal structure represented by the formula $(Li_{7-ax+y}A_x)La_3(Zr_{2-y}B_y)O_{12}$, where A is at least one element selected from the group consisting of Mg, Zn, Al, Ga, and Sc, a is a valence of A, B is at least one element selected from the group consisting of Al, Ga, Sc, Yb, Dy, and Y, x is more than 0 and less than 1.0, y is more than 0 and less than 1.0, and 7−ax+y is more than 5.5 and less than 7.0. With this structure, the solid-state electrolyte according to the present invention can be used as a solid-state electrolyte layer having high ionic conductivity, and can be used to realize an all-solid-state battery having excellent battery characteristics.

In the solid-state electrolyte according to the present invention, it is preferable that x is more than 0.15 and less than 0.34, y is more than 0 and less than 0.30, and 7−ax+y 6.1 to 6.5.

In the solid-state electrolyte according to the present invention, it is preferable that A is Ga.

The all-solid-state battery according to the present invention includes: a solid-state electrolyte layer which includes the solid-state electrolyte according to the present invention; a positive electrode joined to one surface of the solid-state electrolyte layer by sintering; and a negative electrode joined to another surface of the solid-state electrolyte layer by sintering.

According to the present invention, it is possible to improve the ionic conductivity of the solid-state electrolyte and to improve the battery characteristics of the all-solid-state battery.

DETAILED DESCRIPTION OF THE INVENTION

Hereinafter, an example of preferred embodiments of the present invention will be described. However, the following embodiments are merely examples. The present invention is not limited to the following embodiments at all.

Figure 1:
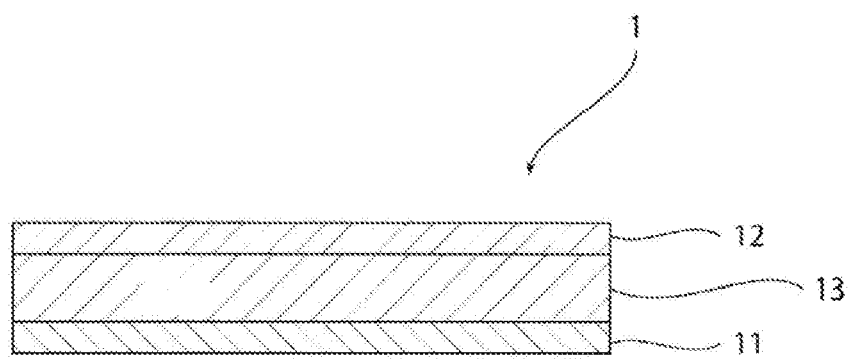
FIG. 1 is a schematic cross-sectional view of an all-solid-state battery according to an embodiment of the present invention.

FIG. 1 is a schematic cross-sectional view of an all-solid-state battery 1 according to this embodiment. As shown in FIG. 1, the battery includes a positive electrode 11, a negative electrode 12, and a solid-state electrolyte layer 13.

The positive electrode 11 includes positive electrode active material particles. Examples of the positive electrode active material particles to be preferably used include lithium-containing phosphate compound particles having a NaSICON-type structure, lithium-containing phosphate compound particles having an olivine-type structure, lithium-containing layered oxide particles, and lithium-containing oxide particles having a spinel-type structure. Specific examples of the lithium-containing phosphate compound having a NaSICON-type structure to be preferably used include $Li_3V_2(PO_4)_3$. Specific examples of the lithium-containing phosphate compound having an olivine-type structure to be preferably used include $Li_3Fe_2(PO_4)_3$ and $LiMnPO_4$. Specific examples of the lithium-containing layered oxide particles to be preferably used include $LiCoO_2$ and $LiCo_{1/3}Ni_{1/3}Mn_{1/3}O_2$. Specific examples of the lithium-containing oxide having a spinel-type structure to be preferably used include $LiMn_2O_4$, $LiNi_{0.5}Mn_{1.5}O_4$, and $Li_4Ti_5O_{12}$. Only one kind of these positive electrode active material particles may be used, or a plurality of kinds thereof may be mixed and used.

The positive electrode 11 may further include a solid-state electrolyte. The kind of the solid-state electrolyte included in the positive electrode 11 is not particularly limited. The positive electrode 11 preferably includes the same kind of solid-state electrolyte as the solid-state electrolyte contained in the solid-state electrolyte layer 13. In this case, the close contact between the solid-state electrolyte layer 13 and the positive electrode 11 can be improved.

The negative electrode 12 includes negative electrode active material particles. Specific examples of the negative electrode active material particles preferably used include compound particles represented by $MO_x$ (M is at least one selected from the group consisting of Ti, Si, Sn, Cr, Fe, Nb, and Mo, and X is equal to or more than 0.9 and equal to or less than 2.0), graphite-lithium compound particles, lithium metal, lithium alloy particles, lithium-containing phosphate compound particles having a NaSICON-type structure, lithium-containing phosphate compound particles having an olivine-type structure, and lithium-containing oxide particles having a spinel-type structure. Specific examples of lithium alloys to be preferably used include Li—Al alloys. Specific examples of the lithium-containing phosphate compound having a NaSICON-type structure to be preferably used include $Li_3V_2(PO_4)_3$. Specific examples of the lithium-containing phosphate compound having an olivine-type structure to be preferably used include $Li_3Fe_2(PO_4)_3$. Specific examples of the lithium-containing oxide having a spinel-type structure to be preferably used include $Li_4Ti_5O_{12}$. Only one kind of these negative electrode active material particles may be used, or a plurality of kinds thereof may be mixed and used.

The negative electrode 12 may further include a solid-state electrolyte. The kind of solid-state electrolyte included in the negative electrode 12 is not particularly limited. The negative electrode 12 preferably includes the same kind of solid-state electrolyte as the solid-state electrolyte contained in the solid-state electrolyte layer 13. In this case, the close contact between the solid-state electrolyte layer 13 and the negative electrode 12 can be improved.

The solid-state electrolyte layer 13 is disposed between the positive electrode 11 and the negative electrode 12. That is, the positive electrode 11 is disposed on one side of the solid-state electrolyte layer 13, and the negative electrode 12 is disposed on the other side thereof. Each of the positive and negative electrodes 11 and 12 is joined to the solid-state electrolyte layer 13 by sintering. In other words, the positive electrode 11, the solid-state electrolyte layer 13, and the negative electrode 12 are an integrated sintered body.

The solid-state electrolyte contained in the solid-state electrolyte layer 13 has a garnet-type crystal structure represented by the formula $(Li_{7-ax+y}A_x)La_3(Zr_{2-y}B_y)O_{12}$, where A is at least one element selected from the group consisting of Mg, Zn, Al, Ga, and Sc, a is a valence of A, B is at least one element selected from the group consisting of Al, Ga, Sc, Yb, Dy, and Y, x is more than 0 and less than 1.0, y is more than 0 and less than 1.0, and 7−ax+y is more than 5.5 and less than 7.0.

A part of Li in $Li_7La_3Zr_2O_{12}$ having a garnet-type structure is substituted with A (at least one element selected from the group consisting of Mg, Zn, Al, Ga, and Sc) and a part of Zr is substituted with B (at least one element selected from the group consisting of Al, Ga, Sc, Yb, Dy, and Y), so that it is possible to achieve higher ionic conductivity than the ionic conductivity of $Li_7La_3Zr_2O_{12}$ or the ionic conductivity of $Li_7La_3Zr_2O_{12}$ in which a part of only one of Li and Zr is substituted with Al. As a result of substituting both Li and Zr with A and B, respectively, the all-solid-state battery 1 having the solid-state electrolyte layer 13 is excellent in battery characteristics such as power density.

As a result of investigation by the inventors, it has been found that a solid-state electrolyte in which a part of Li in $Li_7La_3Zr_2O_{12}$ is not substituted with A (at least one element selected from the group consisting of Mg, Zn, Al, Ga, and Sc) and a part of Zr is substituted with B (at least one element selected from the group consisting of Al, Ga, Sc, Yb, Dy, and Y) does not have sufficiently high ionic conductivity. The present inventors found that when a part of Zr in $Li_7La_3Zr_2O_{12}$ was substituted with B (at least one element selected from the group consisting of Al, Ga, Sc, Yb, Dy, and Y) and a part of Li was substituted with A (at least one element selected from the group consisting of Mg, Zn, Al, Ga, and Sc), the ionic conductivity could be greatly improved for the first time. The reason is not clear, but it is believed that one of the factors is that, in the case of a solid-state electrolyte in which a part of Li in $Li_7La_3Zr_2O_{12}$ is not substituted and a part of Zr is substituted with B (at least one element selected from the group consisting of Al, Ga, Sc, Yb, Dy, and Y), a tetragonal crystal as a low-ionic conducting phase is likely to be formed, meanwhile, in the case of the solid-state electrolyte in which a part of Li in $Li_7La_3Zr_2O_{12}$ is substituted with A and a part of Zr is substituted with B, a cubic crystal as a high-ionic conducting phase is likely to be formed. Further, in the case of a solid-state electrolyte in which a part of Li in $Li_7La_3Zr_2O_{12}$ is substituted with A and a part of Zr is not substituted with other elements, the cubic crystal is formed, but the Li occupancy in the Li site is not suitable for conduction. Therefore, it is considered that high ionic conductivity cannot be obtained in the case of the solid-state electrolyte in which a part of Li in $Li_7La_3Zr_2O_{12}$ is substituted with A and a part of Zr is not substituted with other elements.

From the viewpoint of achieving higher ionic conductivity, in the solid-state electrolyte represented by the formula, it is preferable that x is more than 0.15 and less than 0.34, y is more than 0 and less than 0.30, and 7−ax+y is 6.1 to 6.5, it is more preferable that x is more than 0.18 and less than 0.31, y is more than 0.05 and less than 0.21, and 7−ax+y is 6.2 to 6.48, and it is still more preferable that x is more than 0.20 and less than 0.28, y is more than 0.10 and less than 0.18, and 7−ax+y is 6.35 to 6.46.

The solid-state electrolyte preferably includes Ga as A in the formula. In this case, the ionic conductivity of the solid-state electrolyte layer 13 can be further improved. The reason is not clear, but it is believed that one of the factors is that, among Mg, Zn, Al, Ga, and Sc, Ga is likely to be substituted with Li at the Li site and hetero phases are unlikely to be formed.

Note that a part of Li may be substituted with not only Ga, but also a plurality of elements. In this case, it is considered that since variation in the Li occupancy of the Li site is reduced, the ionic conductivity can be further increased.

Regarding the amount of Li in the formula, it is desirable that 7−ax+y is satisfied. However, in the case of the garnet-type compound, it is difficult to strictly control the amount of Li because of the influence of Li deficiency at the time of sintering and a trace amount of impurities formed at the grain boundary. As a result of intensive research by the present inventors, it has been found that when the amount of Li contained in the solid-state electrolyte is within a certain range with respect to the stoichiometric ratio, the ionic conductivity does not decrease greatly. Specifically, the amount of Li in the solid-state electrolyte is preferably in the range of about ±3 mol %, more preferably in the range of about ±2 mol %, and still more preferably in the range of about ±1 mol % with respect to the stoichiometric ratio of 7−ax+y. Therefore, the solid-state electrolyte in the present invention includes a solid-state electrolyte in which the amount of Li in the formula $(Li_{7-ax+y}A_x)La_3(Zr_{2-y}B_y)O_{12}$ is in the range of about ±3 mol % with respect to the stoichiometric ratio of 7−ax+y.

Note that the solid-state electrolyte in this embodiment may further contain a Li ion-conducting polymer.

(Method of Producing Solid-State Electrolyte)

Subsequently, an example of a method of producing a solid-state electrolyte will be described.

First, a raw material as a Li source, a raw material as a Zr source, a raw material as a La source, and a raw material containing at least one element selected from the group consisting of Mg, Zn, Al, Ga, and Sc, a raw material containing at least one element selected from the group consisting of Al, Ga, Sc, Yb, and Dy are weighed at a desired ratio and mixed. The resulting mixed powder is pre-fired to produce a pre-fired body. Then, the resulting pre-fired body is fired to obtain a solid-state electrolyte.

Note that the material containing at least one element selected from the group consisting of Ga, Al, Mg, Zn, and Sc may be a metallic oxide, a metallic hydroxides, a metallic nitrate, a metallic organic substance, a metallic simple substance, and a metallic composite oxide of each of the elements. The powders of the raw materials may be added at the stage of blending the materials, or may be added at the stage after producing the garnet-type crystal phase and before sintering Further, a raw material containing at least one element selected from the group consisting of Al, Ga, Sc, Yb, Dy, and Y with which a part of Zr is substituted may be a raw material obtained by previously solid-solving at least one element selected from the group consisting of Al, Ga, Sc, Yb, Dy, and Y in $ZrO_2$. That is, a compound represented by the formula $Zr_{1-x}B_xO_{2-1/2x}$ (where B is at least one element selected from the group consisting of Al, Ga, Sc, Yb, Dy, and Y) may be used as the raw material. In this manner, it is considered that at least one element selected from the group consisting of Al, Ga, Sc, Yb, Dy, and Y is likely to be solid-solved in the garnet-type crystal, and thus hetero phases are unlikely to be formed.

(Method of Producing All-Solid-State Battery 1)

Subsequently, an example of a method of producing an all-solid-state battery 1 will be described.

First, a paste is prepared by appropriately mixing a solvent, a resin, and the like with active material particles and a solid-state electrolyte. The paste is applied onto a sheet and dried to form a first green sheet for constituting the positive electrode 11. Similarly, a second green sheet for constituting the negative electrode 12 is formed.

A paste is prepared by appropriately mixing a solvent, a resin, and the like with a solid-state electrolyte. The paste is applied and dried to produce a third green sheet for constituting the solid-state electrolyte layer 13.

Next, the first to third green sheets are appropriately laminated to form a laminated body. The resulting laminated body may be pressed. Preferred pressing methods include isostatic pressing and the like.

Thereafter, the laminated body is sintered to form the all-solid-state battery 1.

Hereinafter, the present invention will be described in more detail based on specific examples, however, the present invention is not limited to the following examples at all, and may be modified as appropriate without changing the gist thereof.

Comparative Example 1

Raw materials such as lithium hydroxide monohydrate ($LiOH.H_2O$), lanthanum hydroxide ($La(OH)_3$), zirconium oxide ($ZrO_2$), and aluminum oxide ($Al_2O_3$) were appropriately weighed so as to have the composition shown in Table 1 below. Next, water was added to the raw materials, and the resultant was enclosed in a 100 ml polyethylene pot made of polyethylene. The polyethylene pot was rotated at 150 rpm for 16 hours to mix the raw materials, and slurry was obtained. Lithium hydroxide monohydrate ($LiOH.H_2O$) as a Li source was charged in excess of 3 mass % with respect to the target composition in consideration of Li deficiency at the time of sintering.

Subsequently, the resulting slurry was dried and then fired in a mixed gas of nitrogen gas and air at 900° C. for 5 hours.

Next, a mixed solvent of toluene and acetone was added to the resulting pre-fired product and pulverized with a planetary ball mill for 6 hours to obtain a solid-state electrolyte.

Then, the resulting solid-state electrolyte, a butyral resin, and alcohol were mixed at a mass ratio of 200:15:140. Thereafter, the alcohol in the mixture was removed on a hot plate at 80° C. to obtain a solid-state electrolyte powder coated with the butyral resin serving as a binder.

Then, the solid-state electrolyte powder coated with the butyral resin was pressed at 90 MPa using a tablet molding machine, and molded into a tablet shape. The resulting solid-state electrolyte tablet was adequately covered with a mother powder and fired at 500° C. in an oxygen atmosphere to remove the butyral resin. Then, the temperature was raised to about 1100° C. in an oxygen atmosphere and the tablet was fired at 1100° C. for 3 hours. Thereafter, a sintered body of the solid-state electrolyte (solid-state electrolyte layer) was obtained by lowering the temperature. The sintered body of the solid-state electrolyte was produced by the above method, and thus a dense sintered body having a bulk density of about 4.8 $g/cm_3$ to 5.1 $g/cm_3$ could be produced.

Comparative Example 2

A solid-state electrolyte layer was produced in the same manner as in Comparative Example 1 except that raw materials such as lithium hydroxide monohydrate ($LiOH.H_2O$), lanthanum hydroxide ($La(OH)_3$), zirconium oxide ($ZrO_2$), and yttrium oxide ($Y_2O_3$) were appropriately weighed so as to have the composition shown in Table 1 below.

Comparative Example 3

A solid-state electrolyte layer was produced in the same manner as in Comparative Example 1 except that raw materials such as lithium hydroxide monohydrate ($LiOH.H_2O$), lanthanum hydroxide ($La(OH)_3$), zirconium oxide ($ZrO_2$), and yttrium oxide ($Y_2O_3$) were appropriately weighed so as to have the composition shown in Table 1 below.

Example 1

A solid-state electrolyte layer was produced in the same manner as in Comparative Example 1 except that raw materials such as lithium hydroxide monohydrate ($LiOH.H_2O$), gallium oxide ($Ga_2O_3$), lanthanum hydroxide ($La(OH)_3$), zirconium oxide ($ZrO_2$), and yttrium oxide ($Y_2O_3$) were appropriately weighed so as to have the composition shown in Table 1 below.

Example 2

A solid-state electrolyte layer was produced in the same manner as in Comparative Example 1 except that raw materials such as lithium hydroxide monohydrate ($LiOH.H_2O$), gallium oxide ($Ga_2O_3$), lanthanum hydroxide ($La(OH)_3$), zirconium oxide ($ZrO_2$), and scandium oxide ($Sc_2O_3$) were appropriately weighed so as to have the composition shown in Table 1 below.

Example 3

A solid-state electrolyte layer was produced in the same manner as in Comparative Example 1 except that raw materials such as lithium hydroxide monohydrate ($LiOH.H_2O$), gallium oxide ($Ga_2O_3$), lanthanum hydroxide ($La(OH)_3$), and zirconium oxide ($ZrO_2$) were appropriately weighed so as to have the composition shown in Table 1 below.

Example 4

A solid-state electrolyte layer was produced in the same manner as in Comparative Example 1 except that raw materials such as lithium hydroxide monohydrate (LiOH.H$_2$O), gallium oxide (Ga$_2$O$_3$), lanthanum hydroxide (La(OH)$_3$), zirconium oxide (ZrO$_2$), and aluminum oxide (Al$_2$O$_3$) were appropriately weighed so as to have the composition shown in Table 1 below.

Example 5

A solid-state electrolyte layer was produced in the same manner as in Comparative Example 1 except that raw materials such as lithium hydroxide monohydrate (LiOH.H$_2$O), gallium oxide (Ga$_2$O$_3$), lanthanum hydroxide (La(OH)$_3$), zirconium oxide (ZrO$_2$), and yttrium oxide (Y$_2$O$_3$) were appropriately weighed so as to have the composition shown in Table 2 below.

Example 6

A solid-state electrolyte layer was produced in the same manner as in Comparative Example 1 except that raw materials such as lithium hydroxide monohydrate (LiOH.H$_2$O), gallium oxide (Ga$_2$O$_3$), lanthanum hydroxide (La(OH)$_3$), zirconium oxide (ZrO$_2$), and yttrium oxide (Y$_2$O$_3$) were appropriately weighed so as to have the composition shown in Table 2 below.

Example 7

A solid-state electrolyte layer was produced in the same manner as in Comparative Example 1 except that raw materials such as lithium hydroxide monohydrate (LiOH.H$_2$O), gallium oxide (Ga$_2$O$_3$), lanthanum hydroxide (La(OH)$_3$), zirconium oxide (ZrO$_2$), and yttrium oxide (Y$_2$O$_3$) were appropriately weighed so as to have the composition shown in Table 2 below.

Example 8

A solid-state electrolyte layer was produced in the same manner as in Comparative Example 1 except that raw materials such as lithium hydroxide monohydrate (LiOH.H$_2$O), gallium oxide (Ga$_2$O$_3$), lanthanum hydroxide (La(OH)$_3$), zirconium oxide (ZrO$_2$), and yttrium oxide (Y$_2$O$_3$) were appropriately weighed so as to have the composition shown in Table 2 below.

Example 9

A solid-state electrolyte layer was produced in the same manner as in Comparative Example 1 except that raw materials such as lithium hydroxide monohydrate (LiOH.H$_2$O), gallium oxide (Ga$_2$O$_3$), lanthanum hydroxide (La(OH)$_3$), zirconium oxide (ZrO$_2$), and scandium oxide (Sc$_2$O$_3$) were appropriately weighed so as to have the composition shown in Table 2 below.

Example 10

A solid-state electrolyte layer was produced in the same manner as in Comparative Example 1 except that raw materials such as lithium hydroxide monohydrate (LiOH.H$_2$O), gallium oxide (Ga$_2$O$_3$), lanthanum hydroxide (La(OH)$_3$), zirconium oxide (ZrO$_2$), and yttrium oxide (Y$_2$O$_3$) were appropriately weighed so as to have the composition shown in Table 3 below.

Example 11

A solid-state electrolyte layer was produced in the same manner as in Comparative Example 1 except that raw materials such as lithium hydroxide monohydrate (LiOH.H$_2$O), gallium oxide (Ga$_2$O$_3$), lanthanum hydroxide (La(OH)$_3$), zirconium oxide (ZrO$_2$), and yttrium oxide (Y$_2$O$_3$) were appropriately weighed so as to have the composition shown in Table 3 below.

Example 12

A solid-state electrolyte layer was produced in the same manner as in Comparative Example 1 except that raw materials such as lithium hydroxide monohydrate (LiOH.H$_2$O), gallium oxide (Ga$_2$O$_3$), lanthanum hydroxide (La(OH)$_3$), zirconium oxide (ZrO$_2$), and yttrium oxide (Y$_2$O$_3$) were appropriately weighed so as to have the composition shown in Table 3 below.

Example 13

A solid-state electrolyte layer was produced in the same manner as in Comparative Example 1 except that raw materials such as lithium hydroxide monohydrate (LiOH.H$_2$O), gallium oxide (Ga$_2$O$_3$), lanthanum hydroxide (La(OH)$_3$), zirconium oxide (ZrO$_2$), and yttrium oxide (Y$_2$O$_3$) were appropriately weighed so as to have the composition shown in Table 3 below.

Example 14

A solid-state electrolyte layer was produced in the same manner as in Comparative Example 1 except that raw materials such as lithium hydroxide monohydrate (LiOH.H$_2$O), gallium oxide (Ga$_2$O$_3$), aluminum oxide (Al$_2$O$_3$), lanthanum hydroxide (La(OH)$_3$), zirconium oxide (ZrO$_2$), and yttrium oxide (Y$_2$O$_3$) were appropriately weighed so as to have the composition shown in Table 4 below.

Example 15

A solid-state electrolyte layer was produced in the same manner as in Comparative Example 1 except that raw materials such as lithium hydroxide monohydrate (LiOH.H$_2$O), gallium oxide (Ga$_2$O$_3$), aluminum oxide (Al$_2$O$_3$), lanthanum hydroxide (La(OH)$_3$), zirconium oxide (ZrO$_2$), and yttrium oxide (Y$_2$O$_3$) were appropriately weighed so as to have the composition shown in Table 4 below.

Example 16

A solid-state electrolyte layer was produced in the same manner as in Comparative Example 1 except that raw materials such as lithium hydroxide monohydrate (LiOH.H$_2$O), aluminum oxide (Al$_2$O$_3$), lanthanum hydroxide (La(OH)$_3$), zirconium oxide (ZrO$_2$), and yttrium oxide (Y$_2$O$_3$) were appropriately weighed so as to have the composition shown in Table 4 below.

(Measurement of Ionic Conductivity of Solid-State Electrolyte Layer)

The ionic conductivity of the solid-state electrolyte layer produced in each of Comparative Examples 1 to 3 and Examples 1 to 16 was measured in the following manner.

First, a platinum (Pt) layer serving as a current collector layer was formed on both surfaces of a sintered tablet (solid-state electrolyte layer) by sputtering, and then the resulting sintered tablet was sandwiched by current collectors made of SUS and fixed. Thereafter, the AC impedance was measured at room temperature (25° C.) in the range of 0.1 MHz to 1 MHz (±50 mV) to evaluate the ionic conductivity.

The results are shown in Tables 1 to 5.

Figure 2:
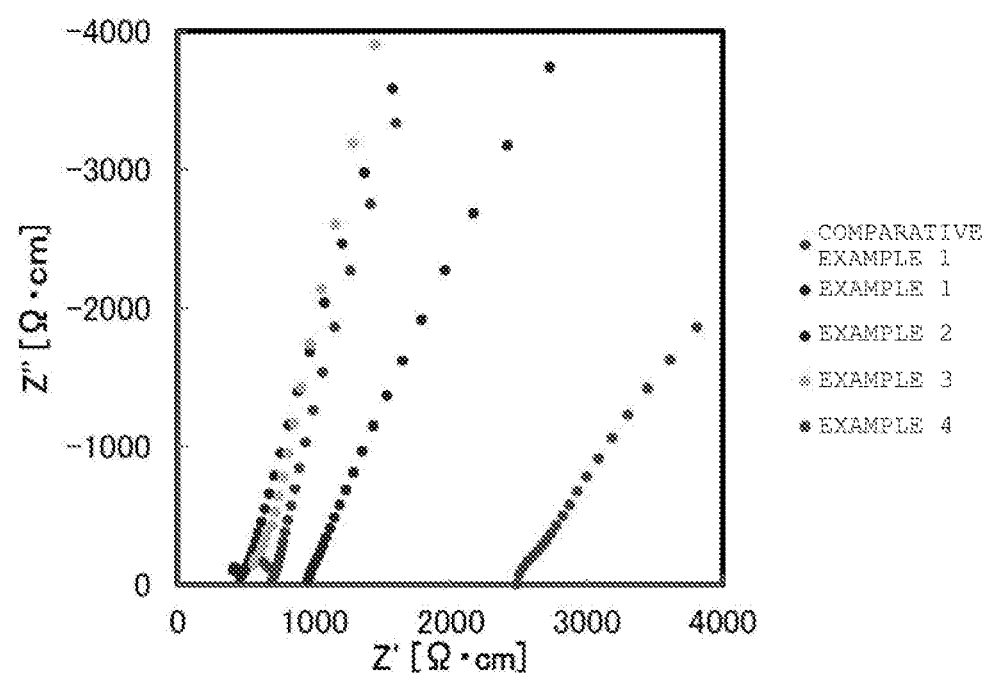
FIG. 2 is a Nyquist plot of the solid-state electrolytes produced in Comparative Example 1 and Examples 1 to 4.

Further, FIG. 2 shows a graph (Nyquist plot) showing measurement results of the AC impedance of the solid-state electrolyte produced in each of Comparative Example 1 and Examples 1 to 4.

Figure 3:
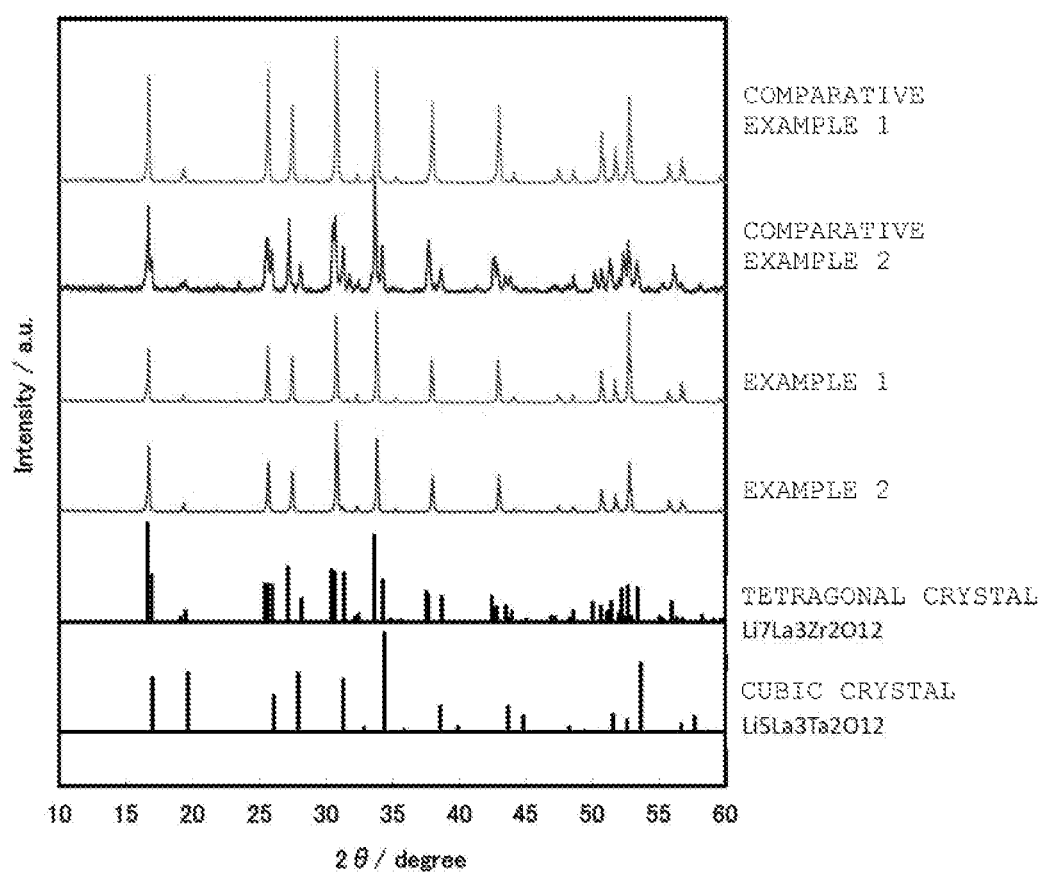
FIG. 3 is an XRD chart of the solid-state electrolyte produced in each of Comparative Examples 1 and 2 and Examples 1 and 2.

Furthermore, FIG. 3 shows an XRD chart of the solid-state electrolyte produced in each of Comparative Examples 1 and 2 and Examples 1 and 2.

As shown in FIG. 3, in the solid-state electrolyte (Comparative Example 2) in which a part of Li was not substituted, but a part of Zr was substituted with Y, a tetragonal crystal (i.e., a low-ionic conducting phase) was obtained as a main phase. On the other hand, in the solid-state electrolyte in which a part of Zr was substituted with Y and a part of Li was substituted with Ga (Example 1), a cubic crystal (i.e., a high-ionic conducting phase) was obtained as a main phase.

Table 1 shows the ionic conductivity of the solid-state electrolyte in which a part of Li was substituted with Al and a part of Zr was not substituted (Comparative Example 1), the ionic conductivity of each of the solid-state electrolytes in which a part of Zr was substituted with Y and a part of Li was not substituted (Comparative Examples 2 and 3), and the ionic conductivity of each of the solid-state electrolytes in which a part of Li was substituted with Ga and a part of Zr was substituted with any of Y, Sc, Ga, and Al (Examples 1 to 4).

The ionic conductivity of the solid-state electrolyte produced in Comparative Example 1 and the ionic conductivity of the solid-state electrolyte produced in Comparative Example 2 were $4.0 \times 10^{-4}$ S/cm and $2.0 \times 10^{-7}$ S/cm, respectively, and these values were low. On the other hand, like the solid-state electrolytes produced in Examples 1 to 4, a solid-state electrolyte in which a part of Li was substituted with Ga and a part of Zr was substituted with a predetermined element exhibited high ionic conductivity.

TABLE 1

| | A | B | x | y | 7-ax + y | Composition | Ionic conductivity ($\times 10^{-4}$ S/cm) |
|---|---|---|---|---|---|---|---|
| Comparative Example 1 | | | | | | $Li_{6.34}Al_{0.22}La_3Zr_2O_{12}$ | 4.0 |
| Comparative Example 2 | | | | | | $Li_{7.15}La_3Zr_{1.85}Y_{0.15}O_{12}$ | 0.002 |
| Comparative Example 3 | | | | | | $Li_{6.85}La_3Zr_{1.85}Y_{0.15}O_{12}$ | 0.001 |
| Example 1 | Ga | Y | 0.23 | 0.15 | 6.46 | $(Li_{6.46}Ga_{0.23})La_3(Zr_{1.85}Y_{0.15})O_{12}$ | 11 |
| Example 2 | Ga | Sc | 0.23 | 0.15 | 6.46 | $(Li_{6.46}Ga_{0.23})La_3(Zr_{1.85}Sc_{0.15})O_{12}$ | 22 |
| Example 3 | Ga | Ga | 0.23 | 0.15 | 6.46 | $(Li_{6.46}Ga_{0.23})La_3(Zr_{1.85}Ga_{0.15})O_{12}$ | 18 |
| Example 4 | Ga | Al | 0.23 | 0.15 | 6.46 | $(Li_{6.46}Ga_{0.23})La_3(Zr_{1.85}Al_{0.85})O_{12}$ | 14 |

Figure 4:
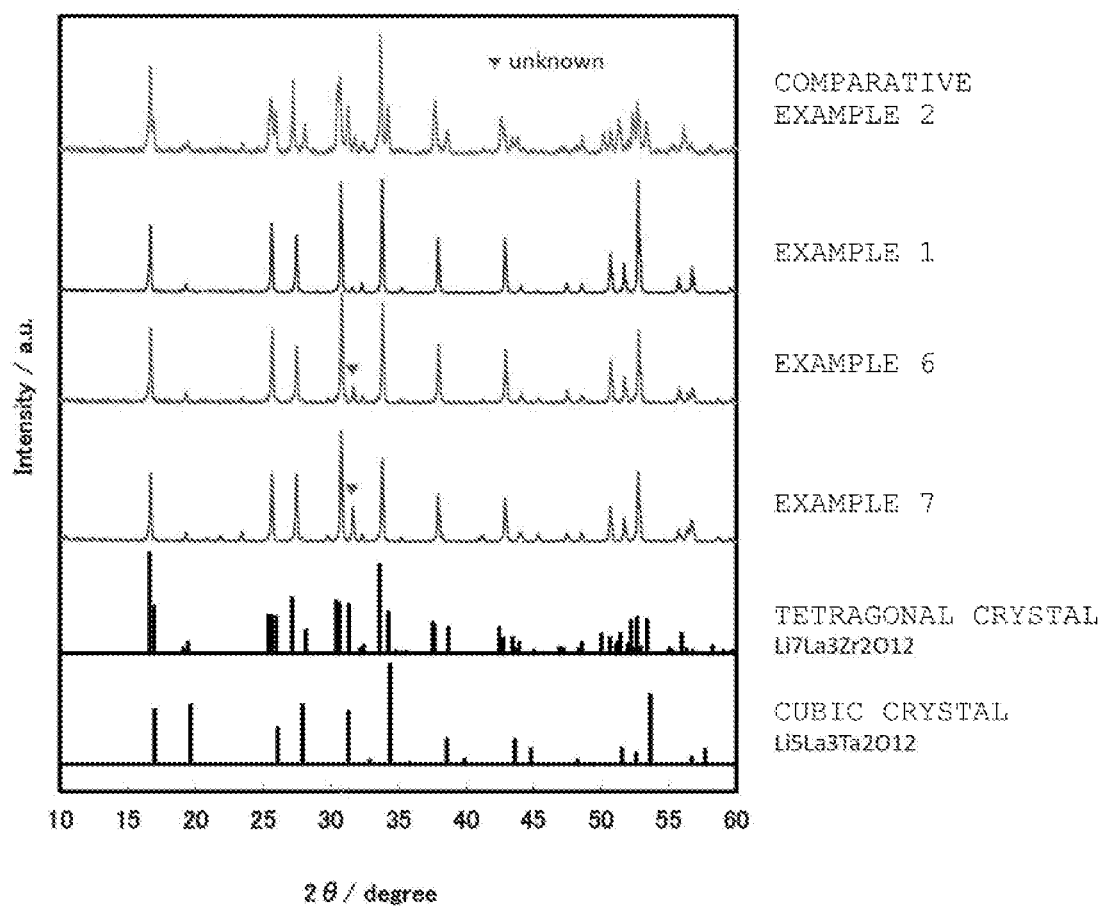
FIG. 4 is an XRD chart of the solid-state electrolyte produced in each of Comparative Example 2 and Examples 1, 6, and 7.

Table 2 shows the ionic conductivity of each of the solid-state electrolytes in which the amount of Li was set to a substantially constant value, and the amount (x) of Li substituted with Ga and the amount (y) of Zr substituted with Y or Sc were changed. FIG. 4 shows an XRD chart of the solid-state electrolyte produced in each of Comparative Example 2 and Examples 1, 6, and 7.

TABLE 2

| | A | B | x | y | 7-ax + y | Composition | Ionic conductivity ($\times 10^{-4}$ S/cm) |
|---|---|---|---|---|---|---|---|
| Comparative Example 1 | | | | | | $Li_{6.34}Al_{0.22}La_3Zr_2O_{12}$ | 4.0 |
| Comparative Example 2 | | Y | | 0.15 | | $Li_{7.15}La_3(Zr_{1.85}Y_{0.15})O_{12}$ | 0.002 |
| Example 5 | Ga | Y | 0.2 | 0.06 | 6.46 | $(Li_{6.46}Ga_{0.20})La_3(Zr_{1.94}Y_{0.08})O_{12}$ | 7.8 |
| Example 1 | Ga | Y | 0.23 | 0.15 | 6.46 | $(Li_{6.46}Ga_{0.23})La_3(Zr_{1.85}Y_{0.15})O_{12}$ | 11 |
| Example 6 | Ga | Y | 0.25 | 0.2 | 6.45 | $(Li_{6.45}Ga_{0.25})La_3(Zr_{1.80}Y_{0.20})O_{12}$ | 10 |
| Example 7 | Ga | Y | 0.28 | 0.3 | 6.46 | $(Li_{6.46}Ga_{0.28})La_3(Zr_{1.70}Y_{0.30})O_{12}$ | 7.1 |
| Example 8 | Ga | Y | 0.35 | 0.5 | 6.45 | $(Li_{6.45}Ga_{0.35})La_3(Zr_{1.50}Y_{0.50})O_{12}$ | 5.5 |
| Example 9 | Ga | Sc | 0.20 | 0.1 | 6.46 | $(Li_{6.46}Ga_{0.20})La_3(Zr_{1.85}Sc_{0.10})O_{12}$ | 12 |
| Example 2 | Ga | Sc | 0.23 | 0.15 | 6.46 | $(Li_{6.46}Ga_{0.23})La_3(Zr_{1.85}Sc_{0.15})O_{12}$ | 22 |

From the results shown in Table 2, it is found that when the amount (y) of Zr substituted with Y or Sc is more than 0, the ionic conductivity is improved as compared with the comparative examples. Further, it is found that the ionic conductivity of the solid-state electrolyte is substantially maximized in the vicinity where y is more than 0.10 and less than 0.20.

Furthermore, there is a tendency that the ionic conductivity of the solid-state electrolyte is increased in the vicinity where y is less than 0.3. This is believed to be due to the fact that the peak intensity of the hetero phase decreases as y decreases in the range where y is less than 0.3, as seen from the XRD chart of FIG. 4. Accordingly, it is found that higher ionic conductivity can be obtained when y is more than 0 and less than 0.30 in the formula.

Table 3 shows the ionic conductivity of the solid-state electrolyte produced in each of Examples 10 to 13 in which the amount (y) of Zr substituted with Y in the formula was 0.15 and the value (x) obtained by substituting Li with Ga was changed as well as the ionic conductivity of the solid-state electrolyte of Comparative Example 1 in which a part of Li and a part of Zr were not substituted with other elements.

TABLE 3

| | A | B | x | y | 7−ax + y | Composition | Ionic conductivity ($\times 10^{-4}$ S/cm) |
|---|---|---|---|---|---|---|---|
| Comparative Example 1 | Al | | 0.22 | | | $(Li_{6.34})Al_{0.22}La_3Zr_2O_{12}$ | 4.0 |
| Example 10 | Ga | Y | 0.12 | 0.15 | 6.78 | $(Li_{6.78}Ga_{0.12})La_3(Zr_{1.80}Y_{0.15})O_{12}$ | 4.3 |
| Example 11 | Ga | Y | 0.17 | 0.15 | 6.54 | $(Li_{5.54}Ga_{0.17})La_3(Zr_{1.80}Y_{0.15})O_{12}$ | 6.0 |
| Example 1 | Ga | Y | 0.23 | 0.15 | 6.45 | $(Li_{5.45}Ga_{0.23})La_3(Zr_{1.80}Y_{0.15})O_{12}$ | 11 |
| Example 12 | Ga | Y | 0.30 | 0.15 | 6.10 | $(Li_{5.10}Ga_{0.30})La_3(Zr_{1.80}Y_{0.15})O_{12}$ | 8.0 |
| Example 13 | Ga | Y | 0.35 | 0.15 | 5.95 | $(Li_{5.95}Ga_{0.35})La_3(Zr_{1.80}Y_{0.15})O_{12}$ | 4.7 |

As shown in Table 3, it is found that there is a tendency that the amount of Li substituted with Ga has an influence on the ionic conductivity.

Table 4 shows the solid-state electrolytes (Examples 1, 14 to 16) in which a part of Zr was substituted with Y and a part of Li was substituted with at least one of Al and Ga.

TABLE 4

| | A | B | x | y | 7−ax + y | Composition | Ionic conductivity ($\times 10^{-4}$ S/cm) |
|---|---|---|---|---|---|---|---|
| Comparative Example 1 | Al | | 0.22 | | | $(Li_{6.34})Al_{0.22}La_3Zr_2O_{12}$ | 4.0 |
| Example 1 | Ga | Y | 0.23 | 0.15 | 6.46 | $(Li_{6.45}Ga_{0.23})La_3(Zr_{1.80}Y_{0.15})O_{12}$ | 11 |
| Example 14 | Ga, Al | Y | 0.23 | 0.15 | 6.46 | $(Li_{6.45}Ga_{0.10}Al_{0.13})La_3(Zr_{1.80}Y_{0.15})O_{12}$ | 15 |
| Example 15 | Ga, Al | Y | 0.23 | 0.15 | 6.46 | $(Li_{6.45}Ga_{0.08}Al_{0.18})La_3(Zr_{1.80}Y_{0.15})O_{12}$ | 11 |
| Example 16 | Al | Y | 0.23 | 0.15 | 6.46 | $(Li_{6.45}Al_{0.23})La_3(Zr_{1.80}Y_{0.15})O_{12}$ | 6.0 |

As shown in Table 4, when Example 1 is compared with Example 16, it is found that the solid-state electrolyte in which Li was partially substituted with Ga had higher ionic conductivity than that of the solid-state electrolyte in which Li was partially substituted with Al.

DESCRIPTION OF REFERENCE SYMBOLS

1: All-solid-state battery
11: Positive electrode
12: Negative electrode
13: Solid-state electrolyte layer

The invention claimed is:

1. A solid-state electrolyte comprising:
a garnet-type crystal structure represented by the formula $Li_{7-ax+y}A_x)La_3(Zr_{2-y}B_y)O_{12}$ wherein
A is at least one element selected from Mg, Zn, Al, Ga, and Sc,
a is a valence of A,
B is at least one element selected from Al, Ga, Sc, Yb, Dy, and Y,
x is more than 0 and less than 1.0,
y is more than 0 and less than 1.0, and
7−ax+y is more than 5.5 and less than 7.0.

2. The solid-state electrolyte according to claim 1, wherein x is more than 0.15 and less than 0.34, y is more than 0 and less than 0.30, and 7−ax+y is 6.1 to 6.5.

3. The solid-state electrolyte according to claim 1, wherein x is more than 0.18 and less than 0.31, y is more than 0.05 and less than 0.21, and 7−ax+y is 6.2 to 6.48.

4. The solid-state electrolyte according to claim 1, wherein x is more than 0.20 and less than 0.28, y is more than 0.10 and less than 0.18, and 7−ax+y is 6.35 to 6.46.

5. The solid-state electrolyte according to claim 1, wherein an amount of Li in the solid-state electrolyte is in a range of ±3 mol % with respect to 7−ax+y.

6. The solid-state electrolyte according to claim 1, wherein an amount of Li in the solid-state electrolyte is in a range of ±2 mol % with respect to 7−ax+y.

7. The solid-state electrolyte according to claim 1, wherein an amount of Li in the solid-state electrolyte is in a range of ±1 mol % with respect to 7−ax+y.

8. The solid-state electrolyte according to claim 1, wherein A is Ga.

9. The solid-state electrolyte according to claim 2, wherein A is Ga.

10. The solid-state electrolyte according to claim 1, wherein A is Ga and B is Y.

11. The solid-state electrolyte according to claim 1, wherein A is Ga and B is Sc.

12. The solid-state electrolyte according to claim 1, wherein A is Ga and B is Ga.

13. The solid-state electrolyte according to claim 1, wherein A is Ga and B is Al.

14. The solid-state electrolyte according to claim 1, wherein A is Ga and Al, and B is Y.

15. The solid-state electrolyte according to claim 1, wherein A is Al and B is Y.

16. An all-solid-state battery comprising:
- a solid-state electrolyte layer which includes the solid-state electrolyte according to claim 1;
- a positive electrode joined to a first surface of the solid-state electrolyte layer; and
- a negative electrode joined to a second surface of the solid-state electrolyte layer.

* * * * *